United States Patent
Smith et al.

(10) Patent No.: US 9,747,655 B2
(45) Date of Patent: Aug. 29, 2017

(54) EMERGENCY SERVICE PROVISION WITH DESTINATION-SPECIFIC INFORMATION

(71) Applicant: SMITH LUBY HOLDINGS, LLC, Norcross, GA (US)

(72) Inventors: William Michael Smith, Norcross, GA (US); Zeus Cory Luby, Snellville, GA (US)

(73) Assignee: William Michael Smith, Atlanta, GA (US)

( * ) Notice: Subject to any disclaimer, the term of this patent is extended or adjusted under 35 U.S.C. 154(b) by 0 days.

(21) Appl. No.: 14/546,711

(22) Filed: Nov. 18, 2014

(65) Prior Publication Data
US 2016/0140835 A1    May 19, 2016

(51) Int. Cl.
G08B 25/00    (2006.01)
G06Q 50/30    (2012.01)
(Continued)

(52) U.S. Cl.
CPC ........... *G06Q 50/30* (2013.01); *G08B 25/001* (2013.01); *G08B 25/006* (2013.01);
(Continued)

(58) Field of Classification Search
CPC ......... H04W 4/22; H04W 4/02; H04W 4/021; H04W 4/023; G08B 25/006;
(Continued)

(56) References Cited

U.S. PATENT DOCUMENTS 8,538,374 B1    9/2013    Haimo
8,588,733 B2    11/2013   Ferguson
(Continued)

FOREIGN PATENT DOCUMENTS

KR    2014078004 A    6/2014

OTHER PUBLICATIONS

Smart Apps for Safer Cities: Taxi Crimes and Panic Buttons, http://ced.berkeley.edu/bpj/2012/11/smart-apps-for-safer-cities-taxi-crimes-and-panic-buttons/.
(Continued)

*Primary Examiner* — Van Trieu
(74) *Attorney, Agent, or Firm* — Bekiares Eliezer LLP; Yuri L. Eliezer

(57) ABSTRACT

An emergency service provision platform may be provided. The platform may be integrated into existing transportation service provision platforms. The platform may be configured to receive pick-up and destination location and track a passenger's route from the pick-up location to the destination. The platform may provide the passenger with an emergency notification button. Upon selection of the emergency notification button, the platform may communicate and alert comprising passenger and driver information to emergency contacts, infrastructure, and personnel. In some embodiments, the alert may be issued upon a detection of deviation from a route between the pick-up location and the destination. The emergency contacts, infrastructure, and personnel that receive the alert may be pre-set or determined dynamically based on the passenger's location at the time of the alert issuance. Furthermore, while the passenger is en route to the destination, the platform may provide the passenger with destination specific information.

20 Claims, 10 Drawing Sheets

(51) Int. Cl.
    G08B 27/00    (2006.01)
    G08B 25/01    (2006.01)

(52) U.S. Cl.
    CPC ........... G08B 25/016 (2013.01); G08B 27/00 (2013.01); G08B 27/001 (2013.01); G08B 27/005 (2013.01)

(58) Field of Classification Search
    CPC .... G08B 25/016; G08B 25/00; G08B 25/003; G08B 25/005; G08B 27/00; G08B 27/001; G08B 27/005; G08B 27/006; G08B 27/008; G08G 1/20; G08G 1/205
    See application file for complete search history.

(56) References Cited

U.S. PATENT DOCUMENTS

| | | | |
|---|---|---|---|
| 2003/0028536 A1* | 2/2003 | Singh | H04W 4/02 |
| 2004/0203622 A1 | 10/2004 | Esque et al. | |
| 2006/0071804 A1* | 4/2006 | Yoshioka | G08G 1/205 |
| | | | 340/636.1 |
| 2009/0326991 A1 | 12/2009 | Wei et al. | |
| 2010/0003948 A1 | 1/2010 | Ray et al. | |
| 2011/0196709 A1 | 8/2011 | Huang et al. | |
| 2012/0041675 A1 | 2/2012 | Juliver et al. | |
| 2012/0203599 A1 | 8/2012 | Choi | |
| 2012/0233246 A1 | 9/2012 | Guemez | |
| 2014/0031000 A1 | 1/2014 | Hanover | |
| 2014/0057590 A1 | 2/2014 | Romero | |
| 2014/0310075 A1* | 10/2014 | Ricci | H04W 48/04 |
| | | | 705/13 |
| 2015/0025790 A1* | 1/2015 | Hwang | G08B 25/10 |
| | | | 701/411 |
| 2015/0061895 A1* | 3/2015 | Ricci | H04W 4/22 |
| | | | 340/902 |
| 2015/0172894 A1* | 6/2015 | Gabel | H04W 4/22 |
| | | | 455/404.2 |

OTHER PUBLICATIONS iPhone App of the Week: Safe Taxi GPS Alarm is a Panic Button for Taxi Passengers. http://www.chipchick.com/2012/09/iphone-app-of-the-week-safe-taxi-gps-alarm-is-a-panic-butt.

\* cited by examiner

EMERGENCY SERVICE PROVISION WITH DESTINATION-SPECIFIC INFORMATION

FIELD OF DISCLOSURE

The present disclosure generally relates to transportation service applications.

BACKGROUND

Passengers of transportation services often use mobile applications for interfacing with the service provider. The applications are used to facilitate the communication of relevant information such as, for example, pick up and destination location, estimated pricing, pickup/drop-off times, and financial data between the passenger and the service provider. The service provider often relies on contracted, third party drivers to use the communicated information in the fulfillment of the transportation service. The service provider must carefully vet these third party drivers and entrust the drivers to provide for the comfortable and secure transportation of the passenger.

BRIEF OVERVIEW

An emergency service provision platform with destination-specific information may be provided. This brief overview is provided to introduce a selection of concepts in a simplified form further described below in the Detailed Description. This brief overview is not intended to identify key features or essential features of the claimed subject matter. Nor is this brief overview intended to be used to limit the claimed subject matter's scope.

An emergency service provision platform may be provided. The platform may be integrated into existing transportation service provision platforms. The platform may be configured to receive pick-up and destination location and track a passenger's route from the pick-up location to the destination.

At any time during the route, the platform may provide the passenger with an emergency notification button. Upon selection of the emergency notification button, the platform may communicate an alert comprising passenger and driver information to emergency contacts, infrastructure, and personnel, as well as a platform provider/operator. In some embodiments, the alert may be issued upon a detection of deviation from a route between the pick-up location and the destination.

The emergency contacts, infrastructure, and personnel that receive the alert may be pre-set or determined dynamically based on the passenger's location at the time of the alert issuance. For example, the platform may have access to the passenger's network of contacts (e.g., social network or phone-book associated with the passenger's mobile device) and location information associated with those contacts. Having the passenger's location information (e.g., as retrieved from the passenger's mobile device) may enable the platform to dynamically determine nearby contacts to notify as well as the emergency infrastructure and personnel near the passenger's location.

Furthermore, while the passenger is en route to the destination, the platform may provide the passenger with destination specific information. The information may comprise, for example, the location and contact information associated with emergency service infrastructure and personnel near the passenger's current location and the destination. The information may further comprise marketing and promotional information associated with events and organizations near the passenger's current location and the destination.

Both the foregoing brief overview and the following detailed description provide examples and are explanatory only. Accordingly, the foregoing brief overview and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the Applicants. The Applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure. In the drawings.

DETAILED DESCRIPTION

Figure 1:
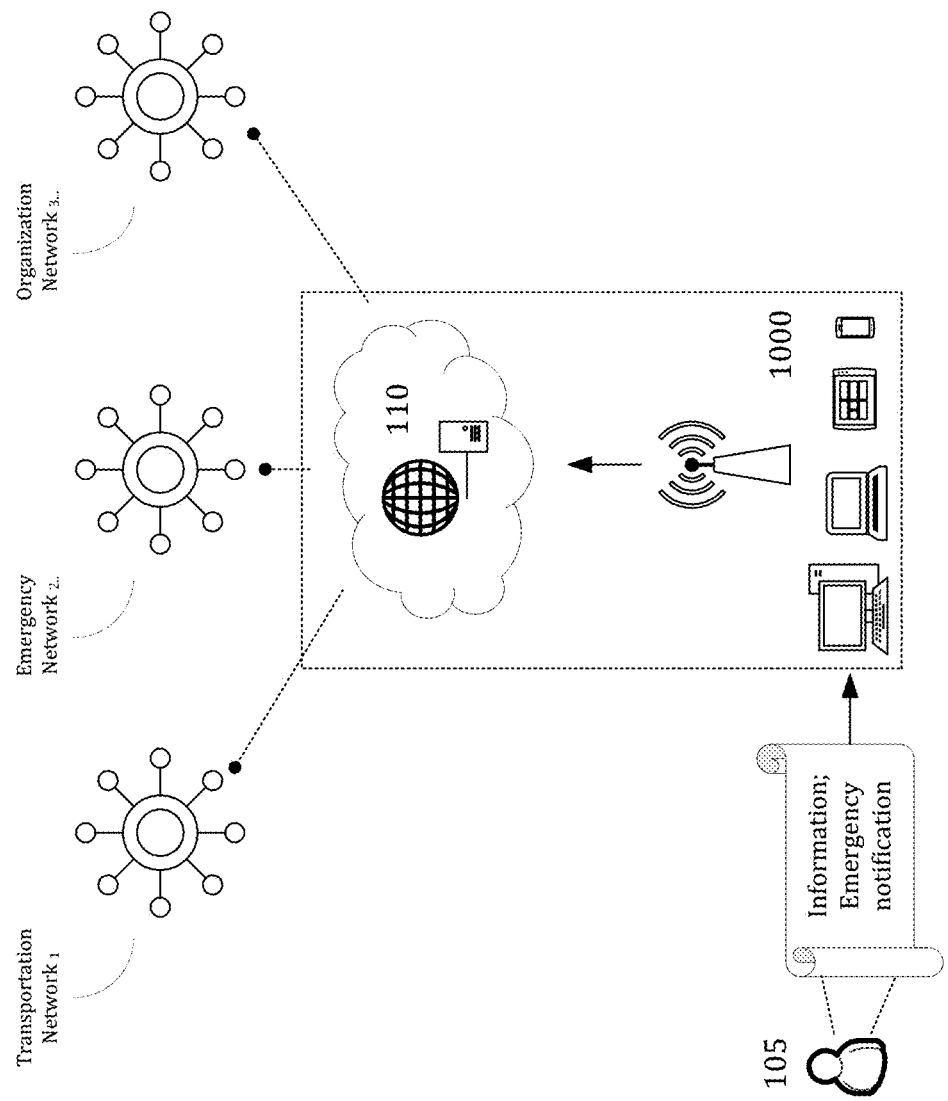
FIG. 1 illustrates a block diagram of an operating environment consistent with the present disclosure.

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

I. Platform Overview

Consistent with embodiments of the present disclosure, an emergency service provision platform with destination-specific information may be provided. This overview is provided to introduce a selection of concepts in a simplified form that are further described below. This overview is not intended to identify key features or essential features of the claimed subject matter. Nor is this overview intended to be used to limit the claimed subject matter's scope.

The emergency service provision platform with destination-specific information may be used by passengers of vehicles, such as, for example taxis or ride-share services, to receive information relevant to a destination, notify contacts when an emergency occurs and track the location of the passenger. The platform may be a stand-alone platform, enabled to provide the various interface aspects for transportation service facilitation. In other embodiments, the platform may be integrated into existing transportation service facilitation platforms.

The emergency service provision platform with destination-specific information may be populated with information pertaining to specific geographical locations. The information may include, but not be limited to, for example, the locations of emergency facilities such as hospitals, clinics, police stations, emergency personnel, and the like. In some embodiments, the information may include promotional and marketing content associated with events and/or organizations corresponding to the geographical locations.

Furthermore, the platform may be populated with data corresponding to drivers (e.g., contracted service providers associated with the ride-share service provider) and passengers (e.g., users of the ride-share service provider's platform).

The platform may receive a pickup and destination location. The platform may then provide the passenger with information relevant to the destination. The platform may further provide the passenger with an emergency button. Once the emergency button has been selected, the platform may provide information to the passenger relevant to emergency services at the destination of the route. In addition, the platform may notify contacts that an emergency has occurred. The platform may further track the passenger location and transmit the passenger location to one or more emergency contacts. The emergency contacts may include, for example, an emergency service provider nearest to the passenger.

Both the foregoing overview and the following detailed description provide examples and are explanatory only. Accordingly, the foregoing overview and the following detailed description should not be considered to be restrictive. Further, features or variations may be provided in addition to those set forth herein. For example, embodiments may be directed to various feature combinations and sub-combinations described in the detailed description.

II. Platform Configuration

FIG. 1 illustrates one possible operating environment through which a platform consistent with embodiments of the present disclosure may be provided. By way of non-limiting example, a platform 100 may be hosted on a centralized server 110, such as, for example, a cloud computing service. A passenger 105 may access platform 100 through a software application. The software application may be embodied as, for example, but not be limited to, a website, a web application, a desktop application, and a mobile application compatible with a computing device 1000.

In some embodiments, platform 100 may be provided as an in-vehicle interface for drivers working for a transportation service. Alternatively, platform 100 may be associated with a transportation service platform. Accordingly, platform 100 may be comprised of a stand-alone software application or a software application provision embedded into an application.

As will be detailed with reference to FIG. 10 below, the computing device through which the platform may be accessed may comprise, but not be limited to, for example, a desktop computer, laptop, a tablet, or mobile telecommunications device. Though the present disclosure is written with reference to a mobile telecommunications device, it should be understood that any computing device may be employed to provide the various embodiments disclosed herein (e.g., embedded in-vehicle devices).

The platform may be populated with information associated with designated locations. A designated location may comprise a geographic area or area with a selected radius from a determined point. Such information associated with a designated location may pertain to emergency service providers. For example, emergency service providers may include hospitals, fire departments and police departments. Information for emergency organizations may include, for example, addresses, descriptions, contact information and links to more information. In this way, platform 100 may be enabled to locate and communicate with the emergency provider nearest to the passenger.

Platform 100 may be populated with more than just emergency contact information. For example, information associated with a designated location may pertain to non-emergency service providers. The information may include, for example, promotional information pertaining to events and organizations. Promotional information may be tied to particular geographical locations.

In addition, information associated with a designated location may pertain to events associated with a location. Information associated with such events may include, for example, an address, description, contact information, dates and times, costs associated with the events, and links (e.g. link for further information or purchasing tickets). The location for which the event is associated may be modified by, for example, purchase of a larger zone.

Having the aforementioned information populated into platform 100, platform users 105 may be presented with such information when he or she is within a corresponding particular geographical location or en-route to a destination associated with the particular geographical location.

The platform may also be populated with passenger information. Such passenger information may include, for example, name, phone number, emergency contacts and insurance information. FIGS. 2-5 illustrate embodiments of user interfaces for receiving passenger information (e.g., form user 105).

Figure 2:
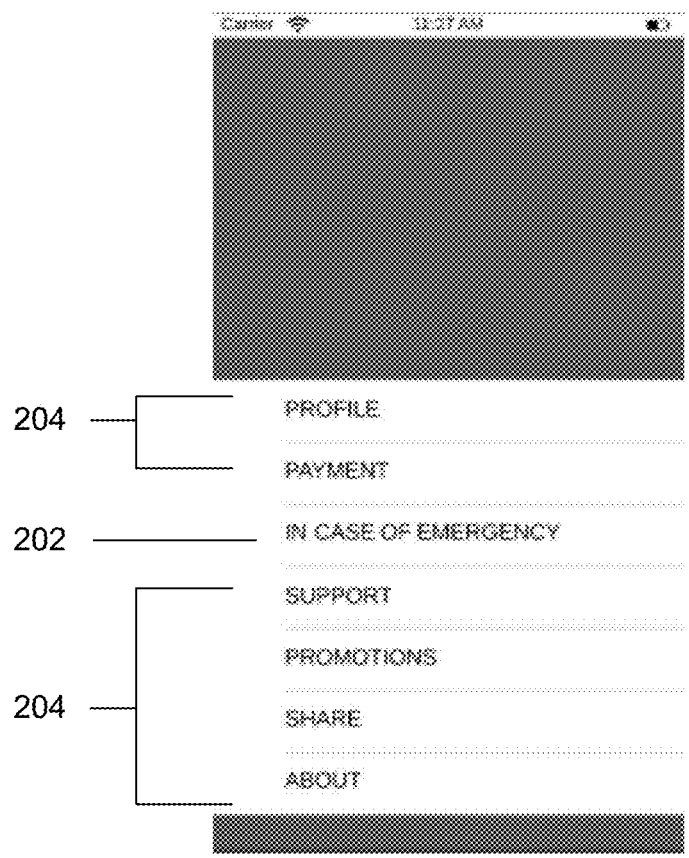
FIG. 2 illustrates one embodiment of an interface with an option for entering emergency information.

FIG. 2 illustrates a user interface for inputting user information into the platform. Input emergency information button 202 may enable user 105 to input emergency information. General application buttons 204 may enable user 105 to navigate through the surrounding platform (e.g., platform support, platform promotions, platform sharing, and the like).

Figure 3:
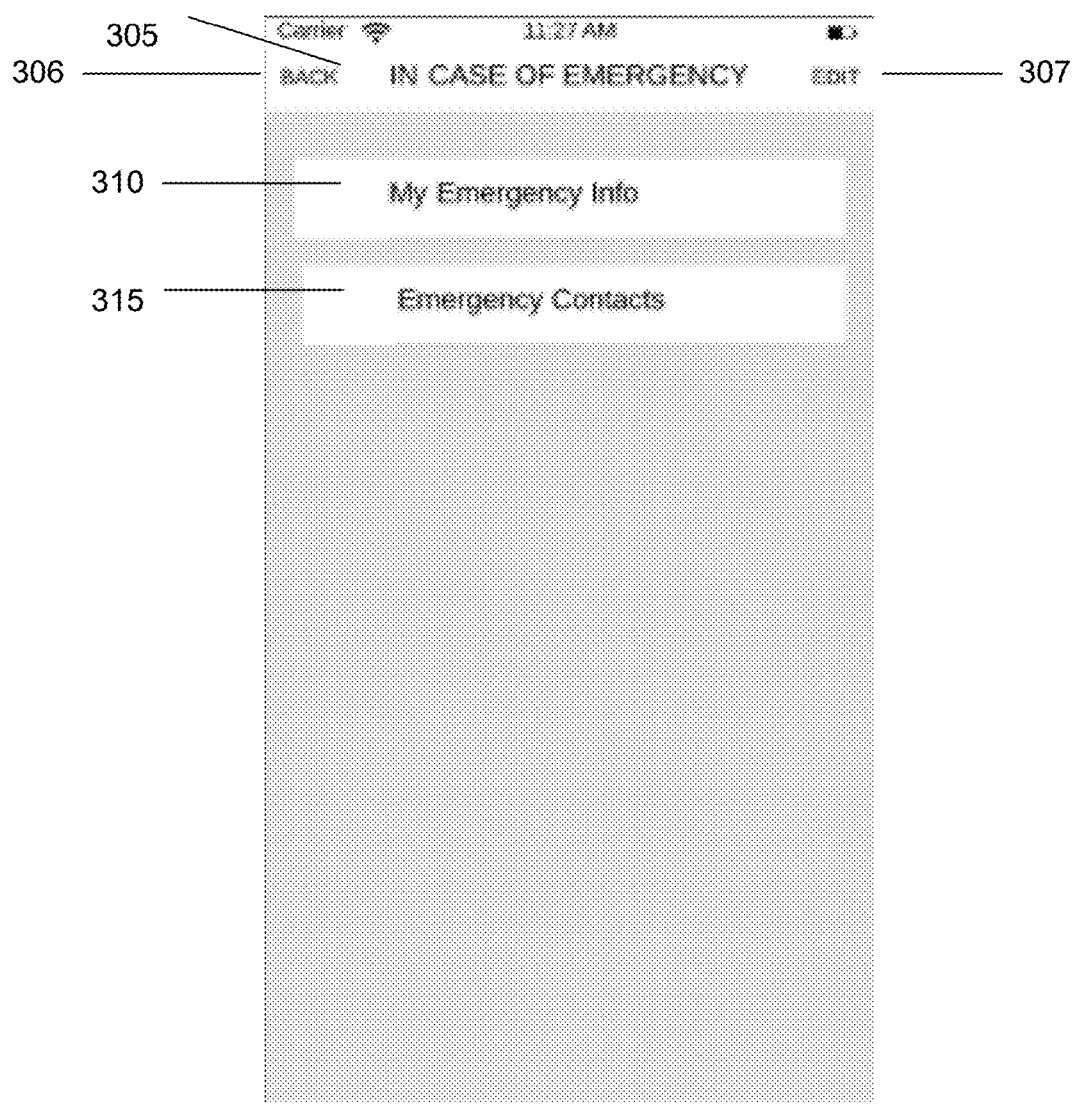
FIG. 3 illustrates one embodiment of an interface for entering emergency information.

FIG. 3 illustrates a user interface for selecting the type of information to input into the platform. Title block 305 may display information such as, for example, information pertaining to the general application or the current window of the application. Navigation button 306 may enable navigation through the platform. Save button 307 may enable user 105 to save modifications to information input into the platform. My emergency info button 310 may enable user 105 to input passenger information, as further illustrated in FIG. 4. Emergency contacts button 315 may enable user 105 to input contact information as further illustrated in FIG. 5.

Figure 4:
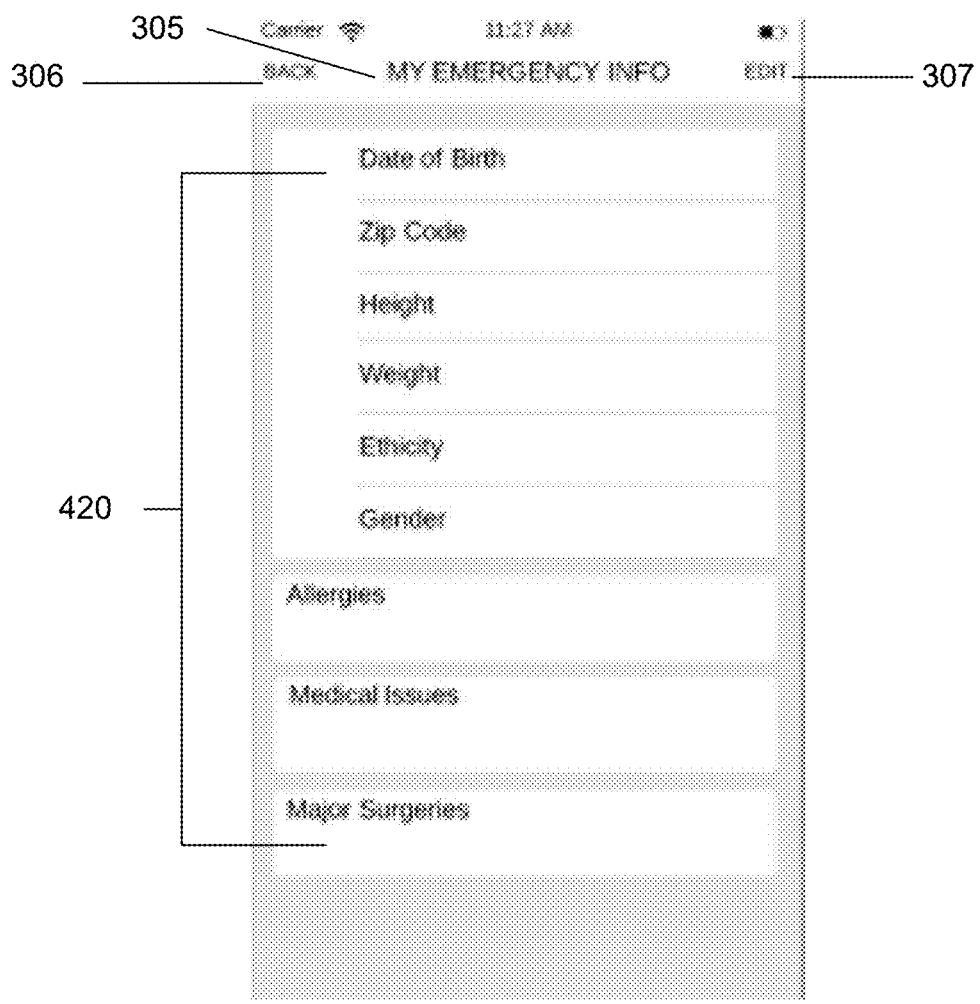
FIG. 4 illustrates one embodiment of an interface for entering passenger emergency information.
Figure 5:
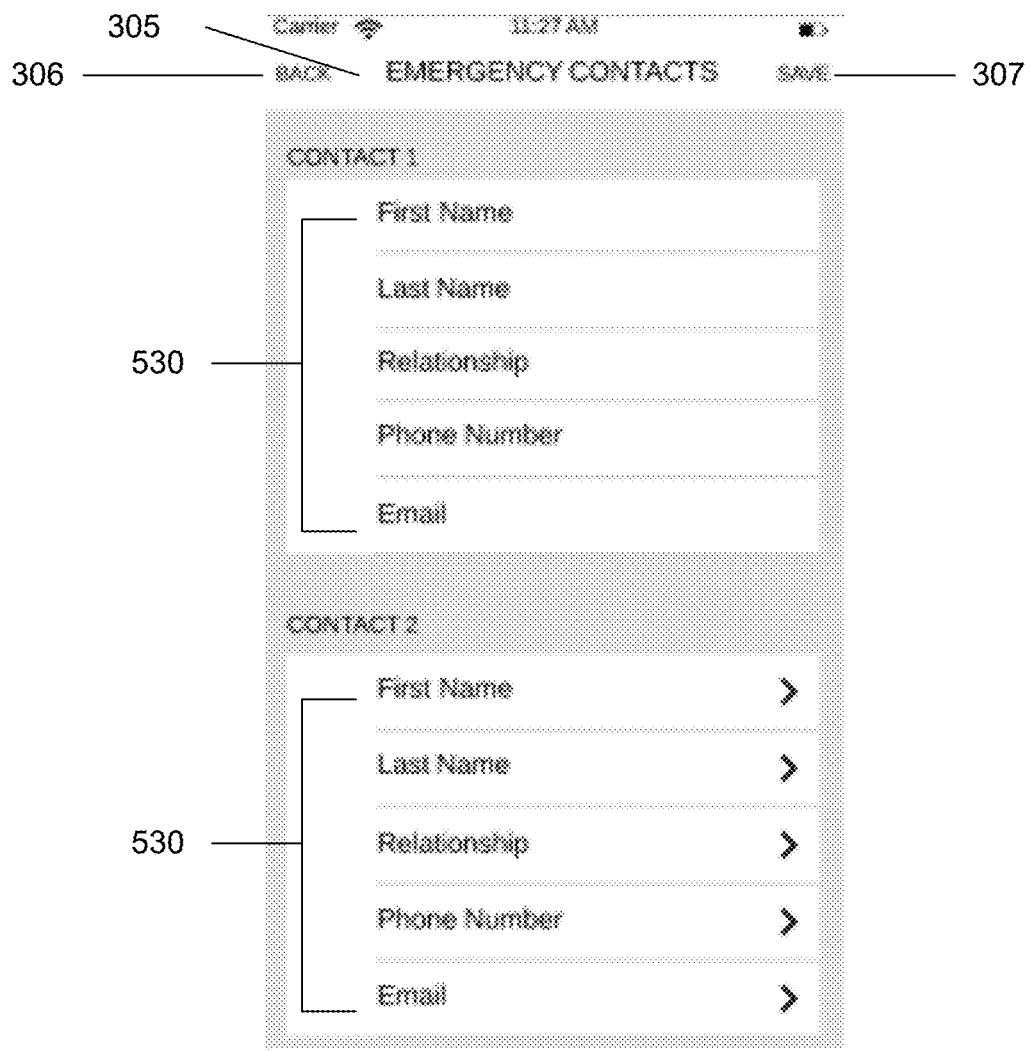
FIG. 5 illustrates one embodiment of an interface for entering emergency contact information.

FIG. 4 illustrates a user interface through which user 105 may input emergency information 420. The emergency information may include, but not be limited to, for example, personal information associated with the user (e.g., name, contact, medical, and demographical information.) FIG. 5 illustrates a user interface through user 105 may input emergency contact information 530 for one or more emergency contacts. In addition to user-inputted emergency contacts, platform 100 may be configured to communicate emergency notifications to platform providers, integrated transportation service providers, and emergency service personnel and infrastructure.

The platform may further be populated with driver information. Such driver information may include, but not be limited to, for example, name, date of birth, social security number, driver's license number and vehicle tag number. This information may, in turn, be shared with the emergency contacts in case of an emergency.

III. Platform Operation

Figure 6:
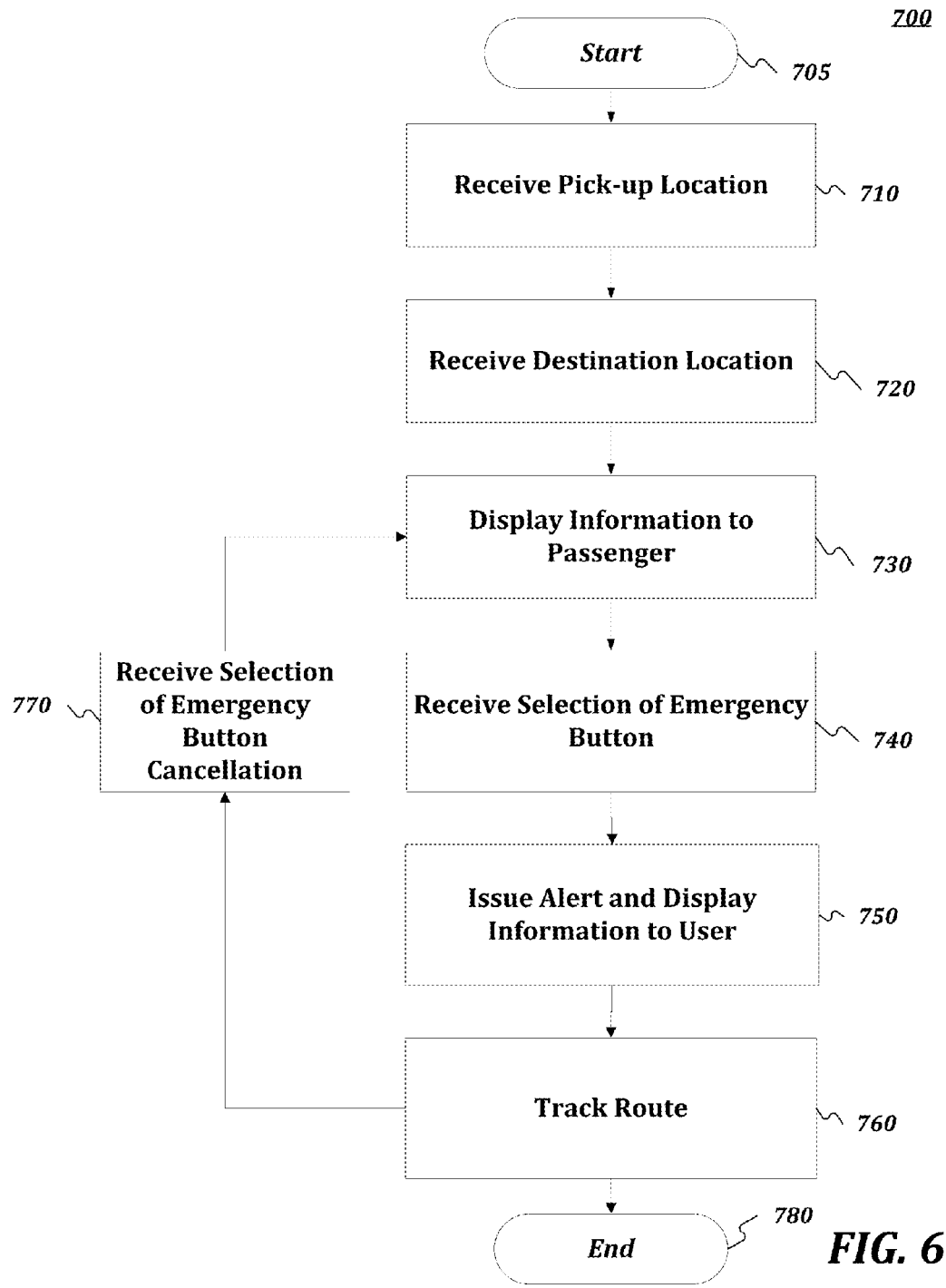
FIG. 6 is a flow chart of a method for providing an emergency service provision with destination-specific information platform.

FIG. 6 is a flow chart setting forth the general stages involved in a method 600 consistent with an embodiment of the disclosure for providing an emergency service provision for platform 100. Method 600 may be implemented using a computing device 1000 as described in more detail below with respect to FIG. 10.

Although method 600 has been described to be performed by platform 100, it should be understood that computing device 1000 may be used to perform the various stages of method 600. Furthermore, in some embodiments, different operations may be performed by different networked elements in operative communication with computing device 1000. For example, server 110 may be employed in the performance of some or all of the stages in method 600. Moreover, server 110 may be configured much like computing device 1000.

Although the stages illustrated by the flow charts are disclosed in a particular order, it should be understood that the order is disclosed for illustrative purposes only. Stages may be combined, separated, reordered, and various intermediary stages may exist. Accordingly, it should be understood that the various stages illustrated within the flow chart may be, in various embodiments, performed in arrangements that differ from the ones illustrated. Moreover, various stages may be added or removed from the flow charts without altering or deterring from the fundamental scope of the depicted methods and systems disclosed herein. Ways to implement the stages of method 600 will be described in greater detail below.

Method 600 may begin at starting block 605 and proceed to stage 610 where platform 100 may receive a pick-up location. Platform 100 may provide an interface to both a passenger and a driver. The pick-up location may be provided by the driver or by the passenger through the interface. The pick-up location may be specified by, but not be limited to, for example, an address or location coordinates such as, for example, GPS coordinates.

Once platform 100 receives a pick-up location in stage 610, method 600 may continue to stage 620 where platform 100 may receive a destination. The destination may be provided through the interface by the driver or by the passenger. The destination may include an address, GPS coordinates, or a general location, such as, for example, a neighborhood or town.

Once platform 100 receives a destination location in stage 620, method 600 may continue to stage 630 where platform 100 may display information to the passenger. Such information may include, for example, information relevant to the destination location. Information may be provided, for example, in a list format or as indications on a map. A list may be organized by, for example, proximity to the destination, alphabetical order. In addition, the list may be subdivided into categories (e.g. restaurants, bars, hotels). Further, the list may display organizations such that organizations that pay to be promoted may appear at the top of the list. In some embodiments, the destination location information may include a list of nearby emergency service infrastructure and personnel.

Figure 7:
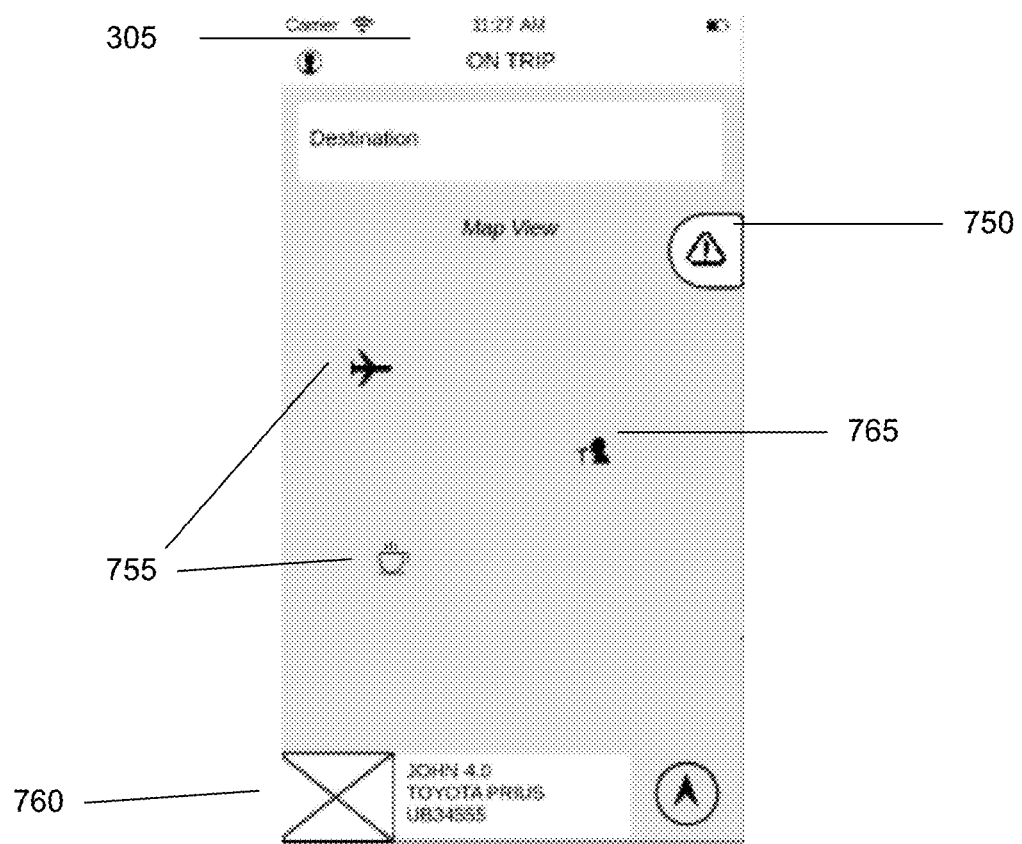
FIG. 7 illustrates one embodiment of an interface for providing information to a user as well as an emergency button.

FIG. 7 illustrates an embodiment of a map displaying information to user 105 (e.g., the passenger). Emergency button 750 may enable the passenger to indicate an emergency. Emergency button 750 may be configured over any user interface provided by computing device 1000, so as to be readily available to user 105 of computing device 1000. Icons 755 may show the passenger where medical, emergency service infrastructure or personnel exist on a map near the destination (e.g., police departments, fire departments and hospitals). In further embodiments, other locations may also be displayed (e.g., entertainment and dining).

Ride information block 760 may inform user 105 of information pertaining to the ride, such as, for example, driver information (e.g. name, vehicle make and model, and vehicle tag number). Passenger location icon 765 may indicate to the passenger location on a map. Location information may be obtained from user devices (e.g., a passenger device and a driver device) used to access platform 100.

Once platform 100 displays information to the user in stage 630, method 600 may continue to stage 640 where platform 100 may receive a selection of the emergency button. For example, a passenger may sense danger and select the emergency button. The emergency button may be, for example, an area indicated on a touch screen of the user device. In addition, if the passenger travels outside of a designated radius of the destination or of the predicted path, platform 100 may prompt the passenger with an indication that such an event has occurred. Platform 100 may further prompt the user with an option to select the emergency button. Alternatively, platform 100 may automatically trigger an emergency notification once the passenger's location deviates from the predicted path or the destination.

Once platform 100 receives a selection of the emergency button in stage 640, method 600 may continue to stage 650 where platform 100 may issue an alert and display information to the passenger. For example, platform 100 may send a text or voice recording to the passenger's emergency contacts indicating that the passenger is experiencing an emergency.

The platform 100 may further enable the emergency contacts to receive information such as, for example, present location of the passenger, location of the passenger when the emergency button was selected, the expected destination, and the expected route. In further embodiments, platform 100 may further provide the emergency contacts with the driver's information including, for example, the driver's vehicle information.

Figure 8:
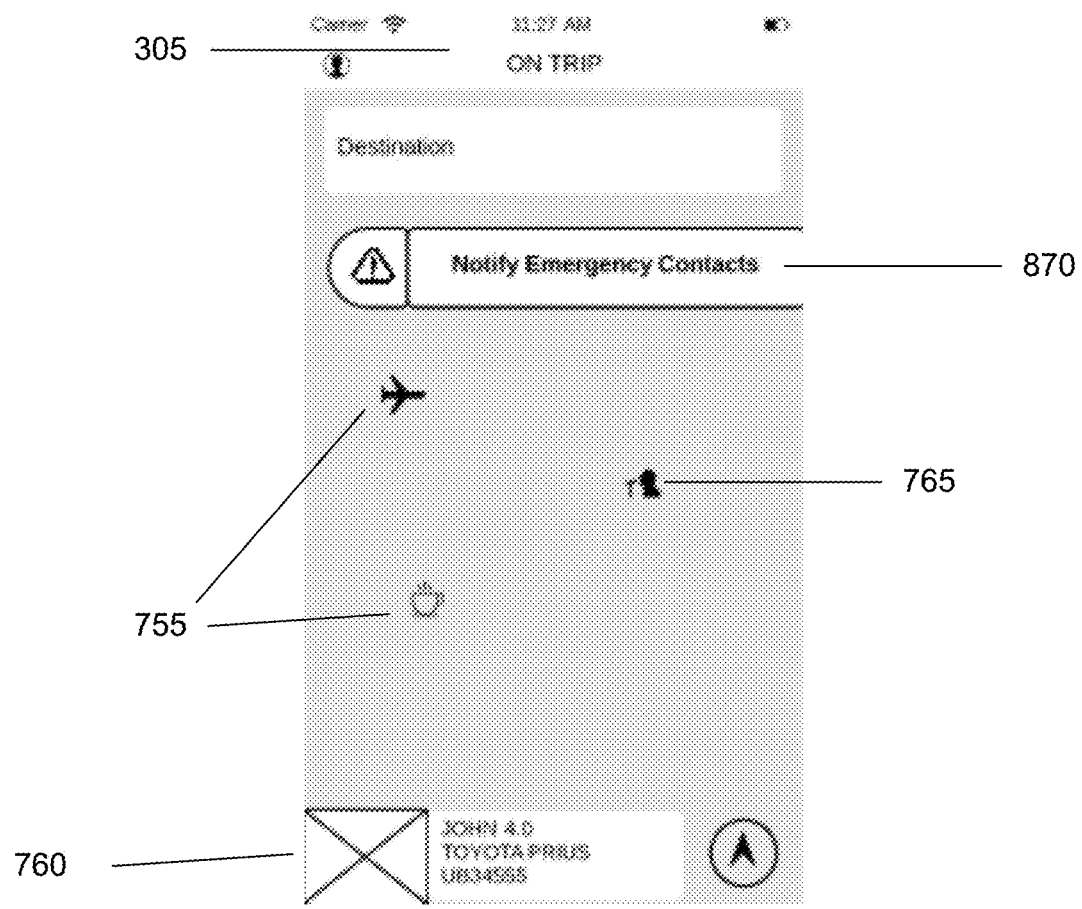
FIG. 8 illustrates one embodiment of an interface after an emergency button has been selected.

FIG. 8 illustrates an embodiment of an interface provided in response to a selection of the emergency button. The platform 100 may notify the passenger's emergency contacts at the selection of the emergency button. Alternatively, the platform 100 may provide the user with a notify emergency contacts button 870. Notify emergency contacts button 870 750 may be configured over any user interface provided by computing device 1000, so as to be readily available to user 105 of computing device 1000. Upon passenger selection of notify emergency contacts button 870, the platform may then notify the passenger's emergency contacts.

Figure 9:
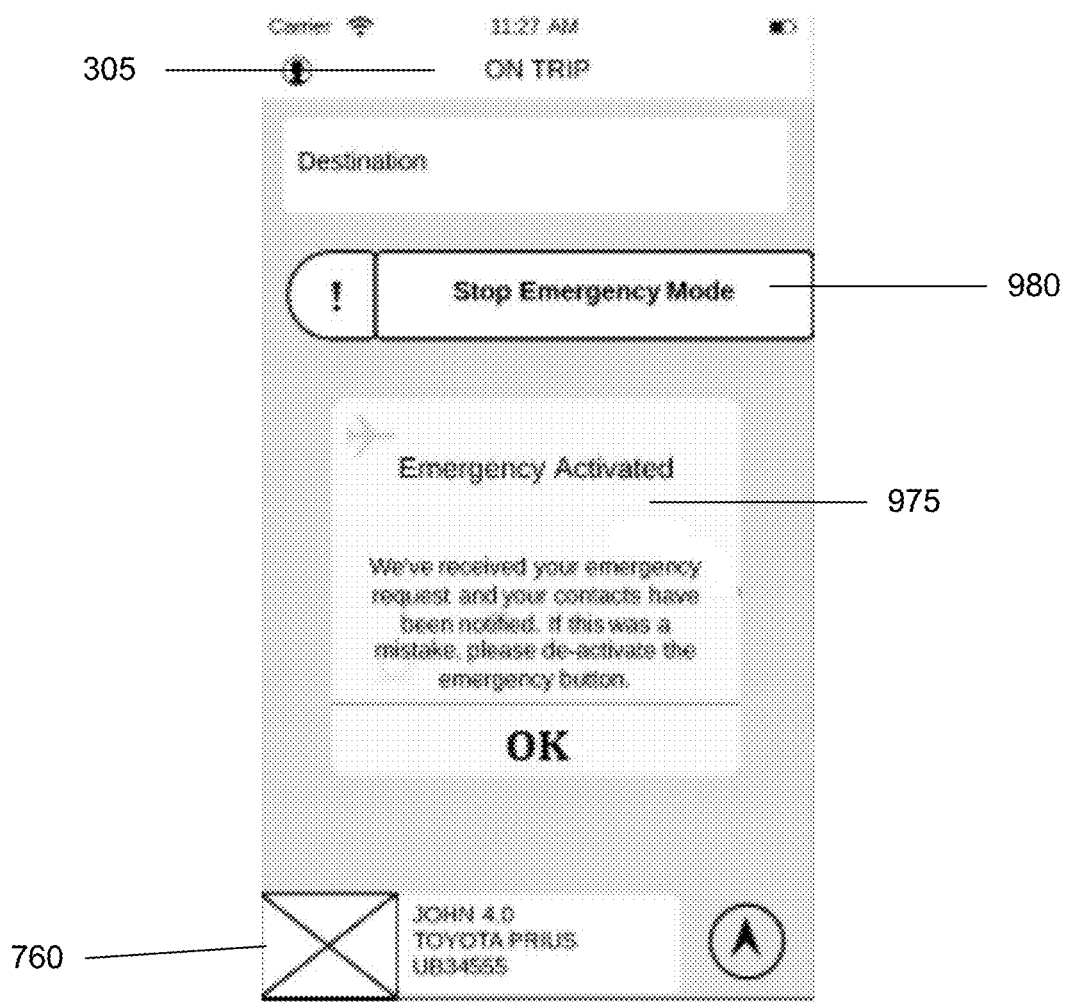
FIG. 9 illustrates one embodiment of an interface after emergency contacts have been contacted.

FIG. 9 illustrates an interface consistent with embodiments of the present disclosure after platform 100 has entered emergency mode and contacted the emergency contacts. Emergency activated window 975 informs user 105 that the emergency button has been activated and the emergency contacts have been notified. Stop emergency mode button 980 enables the user to cancel the emergency mode and notify emergency contacts that user 105 is not experiencing an emergency. Stop emergency mode button 870 750 may be configured over any user interface provided by computing device 1000, so as to be readily available to user 105 of computing device 1000.

Further, upon selection of the emergency contacts button, platform 100 may display information for the passenger relating to emergencies. Information relating to emergencies may include locations of emergency organizations (e.g. police departments, fire departments and hospitals). For example, platform 100 may display hospitals, police departments and fire departments near the location of the destination. Further, platform 100 may enable passengers to select a specific emergency organization and receive further information. Such information may include contact information and links to corresponding websites.

After platform 100 issues an alert and displays information to the user in stage 650, method 600 may proceed to stage 660 where platform 100 may track the route of the passenger. For example, platform 100 may save coordinates pertinent to the passenger and the emergency. Such coordinates may include the location where the emergency button was selected, where the vehicle has since traveled, the expected path of the vehicle, and the destination location. Additionally, platform 100 may transmit such coordinates to the emergency contacts. Vehicle location may be determined by methods such as, for example, global positioning systems, triangulation or local Wi-Fi methods. Once platform 100 tracks the route of the passenger in stage 660, method 600 may then end at stage 680.

Alternatively, from stage 660, where platform 100 tracks the route of the passenger, method 600 may proceed to stage 670, where platform 100 may receive a selection to cancel the emergency button. For example, when platform 100 receives a selection of a cancel of an emergency button, platform 100 may notify emergency contacts that the emergency has been cancelled. Once platform 100 receives a selection to cancel the emergency button in stage 670, method 600 may return to stage 630, where platform 100 may display information to the passenger.

IV. Platform Architecture

The platform 100 may be embodied as, for example, but not be limited to, a website, a web application, a desktop application, and a mobile application compatible with a computing device. The computing device may comprise, but not be limited to, a desktop computer, laptop, a tablet, or mobile telecommunications device. Moreover, the platform 100 may be hosted on a centralized server, such as, for example, a cloud computing service. Although method 600 has been described to be performed by platform 100, it should be understood that, in some embodiments, different operations may be performed by different networked elements in operative communication with computing device 1000.

Embodiments of the present disclosure may comprise a system having a memory storage and a processing unit. The processing unit coupled to the memory storage, wherein the processing unit is configured to perform the stages of method 600. The processing unit may be configured to perform the following stages: receiving a pick-up location; receiving a destination location; receiving a selection of an emergency button; issuing an alert upon receiving a selection of an emergency button; and displaying information associated with the destination location.

Displaying the information associated with the destination location may comprise displaying emergency infrastructure and personnel information. Displaying the information associated with the destination location may comprise displaying marketing and promotional information associated with at least one of the following: events and organizations located near the destination location.

Issuing the alert may comprise accessing passenger information, and accessing driver information and issuing the alert to the passenger's emergency contacts or an emergency service infrastructure and personnel. The alert may include at least one of the following: passenger name, passenger location, driver name, and driver's vehicle information. The processing unit issuing the alert may be in response to detecting that a passenger has deviated from a path between the pick-up location and the destination or is getting further from the destination.

The processing unit may be configured to access passenger information and driver information. Accessing the passenger information comprises accessing a network associated with the passenger, the network being comprised of the passenger's contacts and location information associated with the passenger's contacts (e.g., Facebook, Google+). In this way, issuing the alert may comprise issuing an alert to emergency contacts, service infrastructure and personnel near a location of the passenger.

Figure 10:
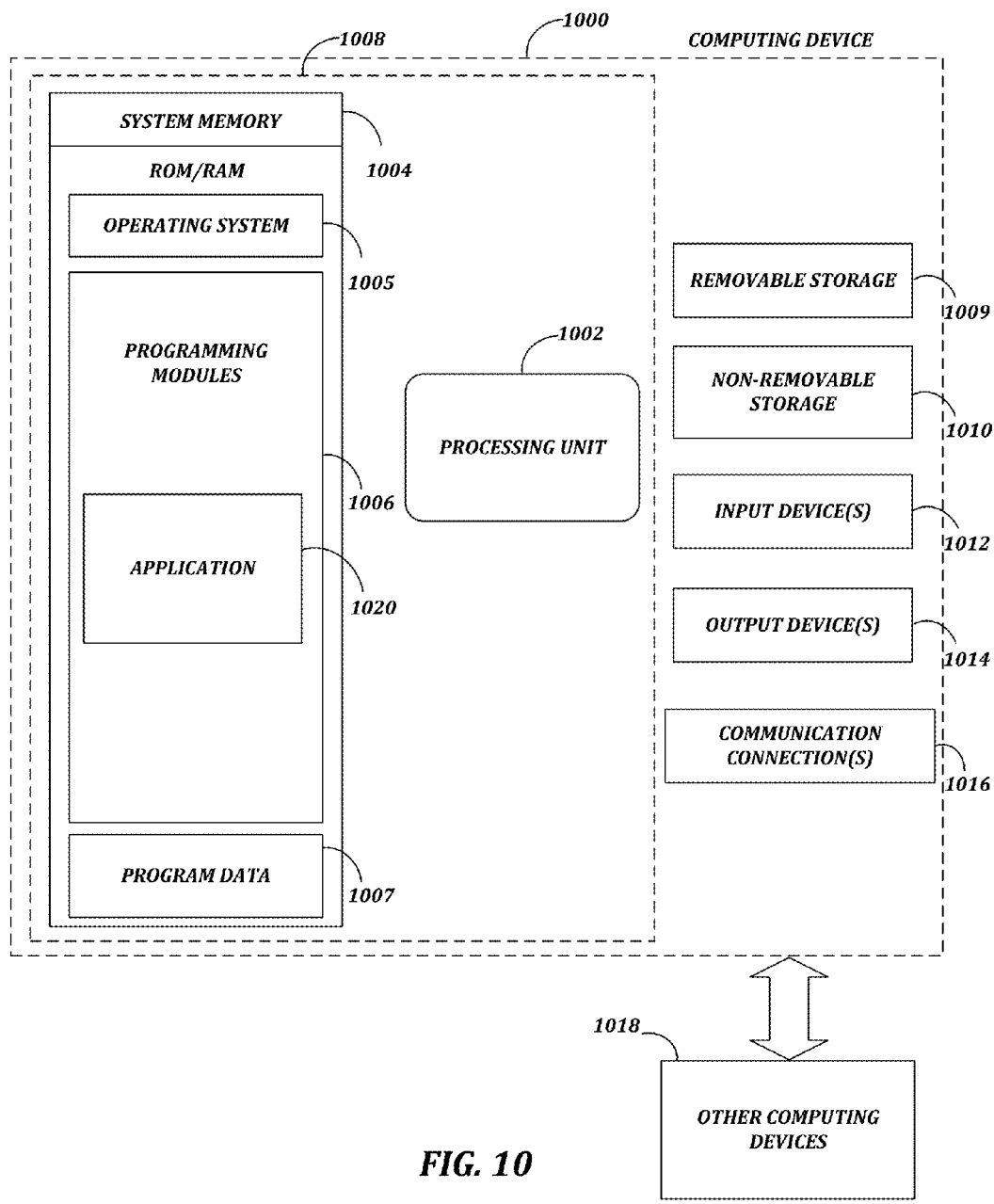
FIG. 10 is a block diagram of a system including a computing device for performing the method of FIG. 6.

FIG. 10 is a block diagram of a system including computing device 1000. Consistent with an embodiment of the disclosure, the aforementioned memory storage and processing unit may be implemented in a computing device, such as computing device 1000 of FIG. 10. Any suitable combination of hardware, software, or firmware may be used to implement the memory storage and processing unit. For example, the memory storage and processing unit may be implemented with computing device 1000 or any of other computing devices 1018, in combination with computing device 1000. The aforementioned system, device, and processors are examples and other systems, devices, and processors may comprise the aforementioned memory storage and processing unit, consistent with embodiments of the disclosure.

With reference to FIG. 10, a system consistent with an embodiment of the disclosure may include a computing device, such as computing device 1000. In a basic configuration, computing device 1000 may include at least one processing unit 1002 and a system memory 1004. Depending on the configuration and type of computing device, system memory 1004 may comprise, but is not limited to, volatile (e.g. random access memory (RAM)), non-volatile (e.g. read-only memory (ROM)), flash memory, or any combination. System memory 1004 may include operating system 1005, one or more programming modules 1006, and may include a program data 1007. Operating system 1005, for example, may be suitable for controlling computing device 1000's operation. In one embodiment, programming modules 1006 may include location tracking and notification contacting applications. Furthermore, embodiments of the disclosure may be practiced in conjunction with a graphics library, other operating systems, or any other application program and is not limited to any particular application or system. This basic configuration is illustrated in FIG. 10 by those components within a dashed line 1008.

Computing device 1000 may have additional features or functionality. For example, computing device 1000 may also include additional data storage devices (removable and/or non-removable) such as, for example, magnetic disks, optical disks, or tape. Such additional storage is illustrated in FIG. 10 by a removable storage 1009 and a non-removable storage 1010. Computer storage media may include volatile and nonvolatile, removable and non-removable media implemented in any method or technology for storage of information, such as computer readable instructions, data structures, program modules, or other data. System memory 1004, removable storage 1009, and non-removable storage 1010 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 1000. Any such computer storage media may be part of device 1000. Computing device 1000 may also have input device(s) 1012 such as a keyboard, a mouse, a pen, a sound input device, a touch input device, etc. Output device(s) 1014 such as a display, speakers, a printer, etc. may also be included. The aforementioned devices are examples and others may be used.

Computing device 1000 may also contain a communication connection 1016 that may allow device 1000 to communicate with other computing devices 1018, such as over a network in a distributed computing environment, for example, an intranet or the Internet. Communication connection 1016 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 1004, including operating system 1005. While executing on processing unit 1002, programming modules 1006 (e.g., location tracking application 1020) may perform processes including, for example, one or more of method 600's stages as described above. The aforementioned process is an example, and processing unit 1002 may perform other processes. Other programming modules that may be used in accordance with embodiments of the present disclosure may include electronic mail and contacts applications, word processing applications, spreadsheet applications, database applications, slide presentation applications, drawing or computer-aided application programs, etc.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, multiprocessor systems, microprocessor-based or programmable consumer electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

All rights including copyrights in the code included herein are vested in and the property of the Applicant. The Applicant retains and reserves all rights in the code included herein, and grants permission to reproduce the material only in connection with reproduction of the granted patent and for no other purpose.

V. Claims

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

Insofar as the description above and the accompanying drawing disclose any additional subject matter that is not within the scope of the claims below, the disclosures are not dedicated to the public and the right to file one or more applications to claims such additional disclosures is reserved.

We claim:

1. A method comprising:
   receiving a pick-up location;
   receiving a destination location;
   receiving a selection of an emergency button;
   issuing an alert upon receiving a selection of an emergency button; and
   displaying information associated with the destination location.

2. The method of claim 1, wherein displaying the information associated with the destination location comprises displaying emergency infrastructure and personnel information.

3. The method of claim 1, wherein displaying the information associated with the destination location comprises displaying marketing and promotional information associated with at least one of the following: events and organizations located near the destination location.

4. The method of claim 1, wherein issuing the alert comprises:
   accessing passenger information, and
   accessing driver information.

5. The method of claim 4, wherein issuing the alert further comprises issuing the alert to the passenger's emergency contacts.

6. The method of claim 4, wherein issuing the alert further comprises issuing the alert to an emergency service infrastructure and personnel.

7. The method of claim 4, wherein the pick-up location is provided by the driver or by the passenger.

8. The method of claim 1, wherein issuing the alert comprises issuing the alert including at least one of the following: passenger name, passenger location, driver name, and driver's vehicle information.

9. The method of claim 1, further comprising issuing the alert in response to detecting that a passenger has deviated from a path between the pick-up location and the destination.

10. The method of claim 1, further comprising issuing the alert in response to detecting that a passenger is getting further from the destination.

11. The method of claim 1, wherein receiving a destination location comprises receiving a selection from at least one of the following:
    a driver; and
    a passenger.

12. A non-transitory computer-readable medium comprising a set of instructions which when executed perform a method comprising:
    receiving a pick-up location;
    receiving a destination location;
    receiving a selection of an emergency button;
    issuing an alert upon receiving a selection of an emergency button; and
    displaying information associated with the destination location.

13. The non-transitory computer-readable medium of claim 12, wherein issuing the alert comprises:
    accessing passenger information, and
    accessing driver information.

14. The non-transitory computer-readable medium of claim 13, wherein issuing the alert comprises issuing an alert to emergency service infrastructure and personnel near a location of the passenger.

15. The non-transitory computer-readable medium of claim 14, wherein the pick-up location is provided by the driver or by the passenger.

16. The non-transitory computer-readable medium of claim 13, wherein accessing the passenger information comprises accessing a network associated with the passenger, the network being comprised of the passenger's contacts and location information associated with the passenger's contacts.

17. The non-transitory computer-readable medium of claim 13, wherein issuing the alert comprises issuing an alert to the passenger's contacts near the passenger's location.

18. The non-transitory computer-readable medium of claim 12, wherein issuing the alert comprises issuing the alert including at least one of the following: passenger name, passenger location, driver name, and driver's vehicle information.

19. The non-transitory computer-readable medium of claim 12, wherein displaying the information associated with the destination location comprises displaying emergency infrastructure and personnel information.

20. The non-transitory computer-readable medium of claim 12, wherein displaying the information associated with the destination location comprises displaying marketing and promotional information associated with at least one of the following: events and organizations located near the destination location.

* * * * *